US009178668B2

(12) United States Patent
Kalavai (10) Patent No.: US 9,178,668 B2
(45) Date of Patent: Nov. 3, 2015

(54) METHOD AND APPARATUS FOR DETECTING IMPROPER CONNECTIONS NEAR A CUSTOMER PREMISES EQUIPMENT

(71) Applicant: IKANOS COMMUNICATIONS, INC., Fremont, CA (US)

(72) Inventor: Raghunath Kalavai, Bedminster, NJ (US)

(73) Assignee: IKANOS COMMUNICATIONS, INC., Fremont, CA (US)

( * ) Notice: Subject to any disclaimer, the term of this patent is extended or adjusted under 35 U.S.C. 154(b) by 0 days.

(21) Appl. No.: 14/341,576

(22) Filed: Jul. 25, 2014

(65) Prior Publication Data

US 2015/0030059 A1    Jan. 29, 2015

Related U.S. Application Data (60) Provisional application No. 61/859,576, filed on Jul. 29, 2013.

(51) Int. Cl.
*H04B 3/46*    (2015.01)
*H04L 1/24*    (2006.01)
*H04M 11/06*   (2006.01)

(52) U.S. Cl.
CPC ............ *H04L 1/248* (2013.01); *H04M 11/062* (2013.01)

(58) Field of Classification Search
None
See application file for complete search history.

(56) References Cited

U.S. PATENT DOCUMENTS

| 2002/0176490 | A1  | 11/2002 | Kamali et al.          |
|--------------|-----|---------|------------------------|
| 2006/0120442 | A1* | 6/2006  | Melsa et al. ... 375/222 |
| 2008/0279269 | A1* | 11/2008 | Duvaut et al. ... 375/227 |
| 2009/0268797 | A1  | 10/2009 | Cunningham             |
| 2012/0026908 | A1  | 2/2012  | Tzannes et al.         |

OTHER PUBLICATIONS

International Search Report issued Nov. 6, 2014 in corresponding PCT/US14/048416.
ITU-T Standard, G.993.2, Series G: Transmission Systems and Media,Digital Systems and Networks, Digital sections and digital line system—Access networks, Very high speed digital subscriber line transceivers 2 (VDSL2)—Feb. 2006; 252 pages.
ITU-T G.996.2, Series G: Transmission Systems and Media, Digital Systems and Networks, Digital sections and digital line system—Access networks, Line Testing for Digital Subscriber lines (DSL).—May 2009, 45 pages.
Carine Neus, 16th IMEKO TC4 Symposium Exploring New Frontiers Methods for Electrical and Electronic Measurements Sep. 22-24, 2008, Florence, Italy, pages.

* cited by examiner

*Primary Examiner* — Adolf Dsouza
(74) *Attorney, Agent, or Firm* — Pillsbury Winthrop Shaw Pittman LLP (57)    ABSTRACT

Methods and apparatuses are disclosed for detecting improper connection near the end of an xDSL loop based on separately analyzing the location and levels of time domain signals associated with different transmission bands in an xDSL band plan. In one embodiment, a method is disclosed to separately convert the received test signal data to different sets of time domain data corresponding to different sets of the separate frequency bands, and then to separately analyze the different sets of time domain data to identify an improper connection near the modem.

19 Claims, 6 Drawing Sheets

METHOD AND APPARATUS FOR DETECTING IMPROPER CONNECTIONS NEAR A CUSTOMER PREMISES EQUIPMENT

CROSS-REFERENCE TO RELATED APPLICATIONS

The present application claims priority to U.S. Prov. Appln. No. 61/859,576 filed Jul. 29, 2013, the contents of which are incorporated herein by reference in their entirety.

FIELD OF THE INVENTION

The present invention relates generally to xDSL communication systems and more particularly to methods and apparatuses for detecting an improper connection near a CPE.

BACKGROUND OF THE RELATED ART

In single-ended line tests (i.e. SELT, see, e.g., ITU-T Standard, G.993.2, SERIES G: TRANSMISSION SYSTEMS AND MEDIA, DIGITAL SYSTEMS AND NETWORKS, Digital sections and digital line system—Access networks, Very high speed digital subscriber line transceivers 2 (VDSL2) (February 2006); ITU-T G.996.2, SERIES G: TRANSMISSION SYSTEMS AND MEDIA, DIGITAL SYSTEMS AND NETWORKS, Digital sections and digital line system—Access networks, Line Testing for Digital Subscriber lines (DSL); and "Feasibility and problems of DSL loop topology identification via single-ended line tests", Carine Neus, 16th IMEKO TC4 Symposium Exploring New Frontiers of Instrumentation and Methods for Electrical and Electronic Measurements Sep. 22-24, 2008, Florence, Italy), a known signal is sent over the loop and the reflected signal is analyzed to determine loop characteristics and any impairments present on the line.

Meanwhile, wiring problems within the home and especially close to the customer premises equipment (CPE) are very common. An example is improperly connecting the wire to the CPE. The connector may not have snapped fully either at the CPE or the wall unit, or it could just be oversight in connecting the wire at all. Other reasons could include wiring being disconnected within the home up to the NID. In any event, such connection problems can lead to unnecessary service calls and/or other inconveniences to both the user and the service provider.

In wired communications (such as DSL, cable modem etc.) loop diagnostics are often based on the analysis of single ended loop testing (SELT). However, current SELT techniques by themselves are not sufficiently adept at detecting improper connections such as those described above.

SUMMARY OF THE INVENTION

According to certain aspects, embodiments of the invention relate to methods and apparatuses to detect loss of connectivity due to improper connection near the CPE modem (i.e. small loop condition) based on the analysis of SELT. In embodiments, this condition is detected based on separately analyzing the location and levels of time domain signals associated with different transmission bands in an xDSL bandplan.

In accordance with these and other aspects, a method for examining connections near a modem in a communications system according to embodiments of the invention includes receiving test signal data from the line for two or more separate frequency bands, separately converting the test signal data to at least first and second different sets of time domain data corresponding to first and second ones of the separate frequency bands, and analyzing the first and second time domain data to identify an improper connection near the modem.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain aspects, embodiments of the invention include an algorithm to detect loss of connectivity due to improper connection to or near the CPE modem based on the analysis of SELT. According to further aspects, automatic detection of such a condition can help resolve the issue with minimal support service. A feedback message from the CPE can alert the customer to fix the problem even without involving the service provider.

Figure 1:
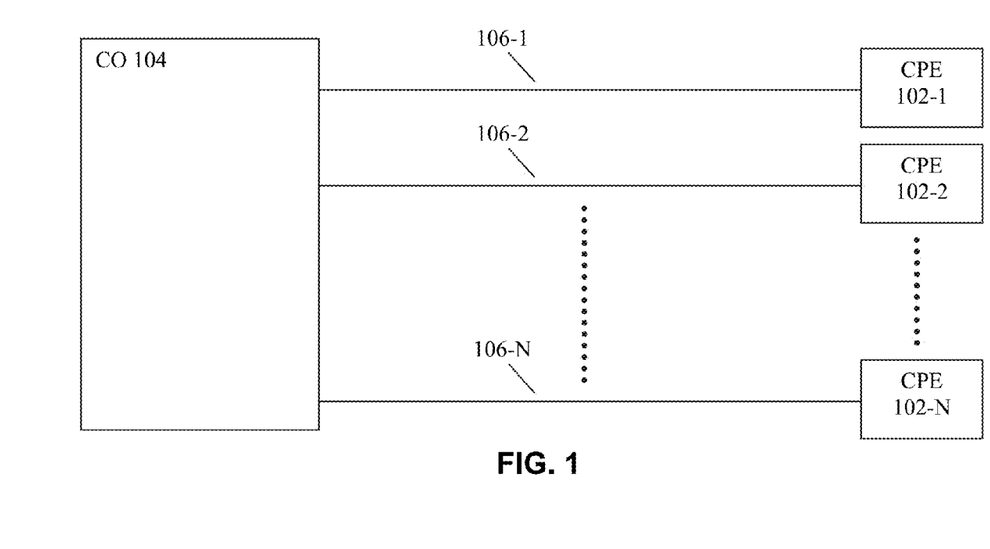
FIG. 1 is a block diagram illustrating an example system in which embodiments of the invention can be implemented.

FIG. 1 is a block diagram illustrating an example system 100 in which embodiments of the invention can be implemented. As shown in FIG. 1, a plurality of N CPE transceivers 102-1 to 102-N are coupled to a CO 104 via respective loops 106-1 to 106-N. In one non-limiting example, system 100 can be a DSL system operating according to VDSL2, in which certain or all of transceivers 102-1 to 102-N are configured as a vectoring group by CO 104. However, the invention is not limited to this example.

As set forth above, in wired communication systems (such as DSL, cable modem etc.) loop diagnostics are often based on analyses of SELT data. For example, CPE 102-1 can perform diagnostics to characterize loop 106-1 using SELT signals transmitted by CPE 102-1 on loop 106-1 and reflected back to CPE 102-1. Specifically, in an example wherein system 100 is operating according to VDSL2, a conventional SELT performed by CPE 102-1 can include continuously transmitting symbols (e.g. modulated REVERB symbols) each VDSL2 symbol period for a period of about 5 seconds to about 2 minutes, and measuring the reflections (i.e. obtaining S11 data) from loop 106-1. It should be noted that some or all of the other CPE's 102-2 to 102-N can be operating in Showtime using the same symbol periods while CPE 102-1 performs its SELT tests.

Figure 2:
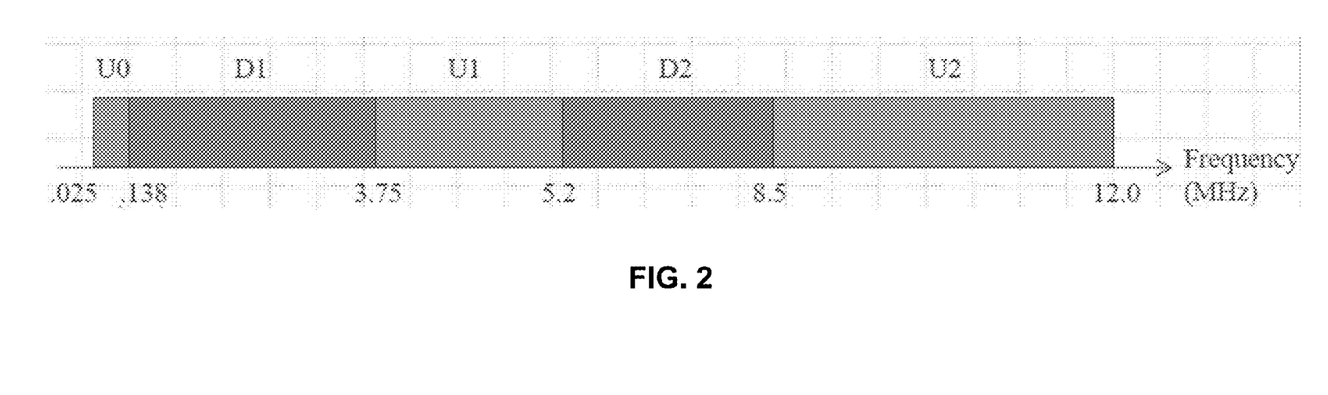
FIG. 2 is a diagram illustrating an example band plan for which SELT signals according to embodiments of the invention can be adapted.

The present inventors recognize that in conventional systems such as VDSL2, the CPE is assigned certain frequency bands in which they are permitted to transmit upstream signals according to a prescribed band plan. An example band plan such as that given in the G.993.2 standard is shown in FIG. 2. As shown, it includes three upstream bands U0 (comprising tones from 0.025 MHz to 0.138 MHz), U1 (comprising tones from 3.75 MHz to 5.2 MHz) and U2 (comprising tones from 8.5 MHz to 12.0 MHz) and two downstream bands D1 (comprising tones from 0.138 MHz to 3.75 MHz) and D2 (comprising tones from 5.2 MHz to 8.5 MHz). So symbols constructed by CPE 102-1 and used in SELT can only use tones in the upstream bands U0, U1 and U2.

As a result, conventional SELT S11 data is available only for signals using the upstream bands (e.g. U0, U1 and U2). Meanwhile, it would be desirable if SELT could be used to accurately detect loop impairments such as small loop conditions. However, the present inventors further recognize that, due to the banded structure of the conventional SELT signal, it is difficult to detect signatures using either frequency domain (FDR) or time domain (TDR) analyses. For example, gaps in the FDR data make it difficult to look for patterns using a FDR analysis. Likewise, discontinuities in the S11 data create artifacts in the TDR signal and clutter the signatures associated with impairments such as small loops.

According to certain aspects, therefore, embodiments of the invention include methods wherein signals from one or more of the upstream bands are analyzed separately using a TDR method, to effectively detect impairments such as small loops. This also helps to exploit the different characteristics of the signal at different bands (for example the velocity of signal changes at different bands). Moreover, by combining information from the separately processed bands, embodiments of the invention can more accurately determine small loop conditions, and can more accurately distinguish legitimate peaks from spurious spikes.

It should be noted that the invention is not limited to systems implementing VDSL2 and/or using bandplans such as that shown in FIG. 2. Rather, those skilled in the art will understand how to implement the invention using other systems, bandplans and/or numbers of bands after being taught by the present examples.

Figure 3:
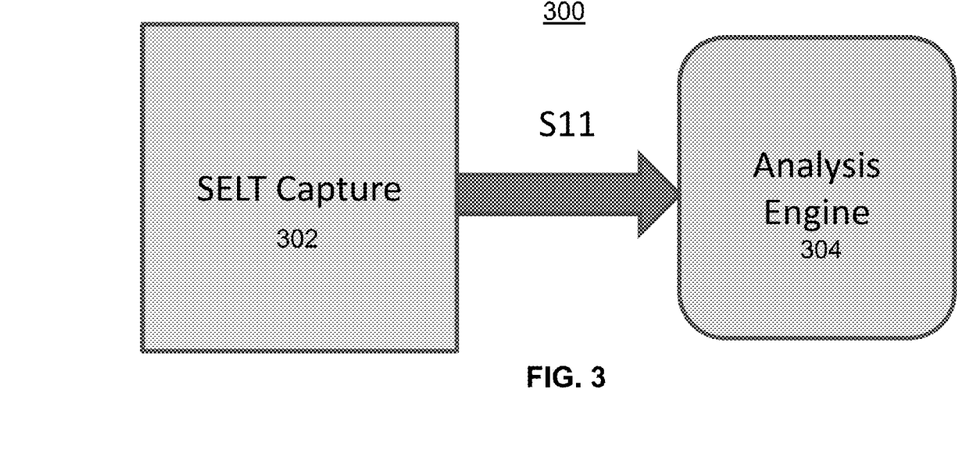
FIG. 3 is a block diagram illustrating an example loop diagnostics apparatus according to embodiments of the invention.

A block diagram illustrating an example apparatus for performing SELT according to embodiments of the invention is shown in FIG. 3. As shown, apparatus 300 includes a SELT capture block 302 and an analysis engine 304.

SELT capture block 302 includes functionality for forming SELT signals using symbols (e.g. modulated REVERB symbols) constructed from tones in one or more of the upstream bands, transmitting the signals on the loop, measuring the reflections from the loop, and providing the S11 reflection data to analysis engine 304. SELT capture block 302 can be implemented using techniques known to those skilled in the art, and so further details thereof will be omitted here for sake of clarity of the invention.

Analysis engine 304 receives the S11 reflection data from capture block 302. In embodiments, engine 304 analyzes data from each of the upstream bands separately using a TDR method, to effectively detect small loop conditions for the CPE for which SELT signals are transmitted and reflected by SELT capture block 302.

In embodiments, apparatus 300 is incorporated in CPE transceivers 102. In these and other embodiments, CPE transceivers 102 (as well as transceivers in CO 104) include DSL transceivers (e.g. VX180 from Ikanos Communications, Inc.) having conventional processors, chipsets, firmware, software, etc. that implement communication services such as those defined by VDSL2, ADSL2, etc. using a band plan such as that shown in FIG. 2. Moreover in these and other embodiments, apparatus 300 can be implemented by adapting SELT functionality such as that provided by diagnostics suites such as SmartCPE provided by Ikanos Communications, Inc. Those skilled in the art will be able to understand how to adapt such processors, chipsets, firmware, software, etc. to implement the SELT functionalities of the present invention after being taught by the above and following examples.

It should be noted that in alternative embodiments, apparatus 300 can be incorporated in a standalone loop diagnostics and/or monitoring device, and those skilled in the art will also be able to implement these embodiments of the invention after being taught by the present disclosure.

It should be further noted that embodiments of the invention will be described in connection with SELT performed on a downstream end of lines 106 in or near CPE transceivers 102 using upstream bands. However, the invention is not limited to this example, and such functionality can also be incorporated in or near transceivers at the CO end of lines 106 using downstream bands.

Figure 4:
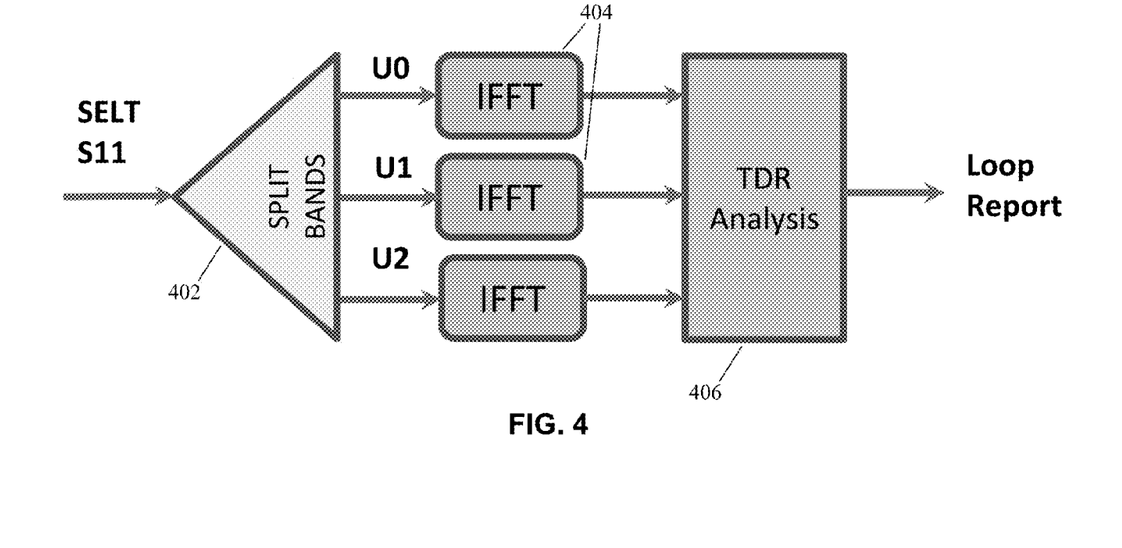
FIG. 4 is a block diagram of an example analysis engine according to embodiments of the invention.

A block diagram illustrating an example analysis engine 304 according to embodiments of the invention is shown in FIG. 4.

As shown, engine 304 receives an input SELT S11 signal, which is essentially the frequency domain representation of the measured reflected signal divided by the transmitted signal, as is well understood by those skilled in the art. This input signal is provided to band splitter 402, which includes passband filters (i.e. frequency domain windows) corresponding to each of the upstream bands used for the transmitted SELT signal. In the example where the band plan of FIG. 2 is used for the transmit signal, this includes the three upstream bands U0 (from 0.025 MHz to 0.138 MHz), U1 (from 3.75 MHz to 5.2 MHz) and U2 (from 8.5 MHz to 12.0 MHz). As set forth previously, the invention is not limited to this example.

The three frequency domain signals from bands U0, U1 and U2 are separately converted to time domain signals by IFFT's 404 and the three time domain signals are analyzed by TDR analysis block 406 to produce a loop report which can include, for example, the detection of a small loop condition. Additional implementation features of an example engine 304 such as that shown in FIG. 4 will become even more apparent from the descriptions below in connection with the analysis methods performed by engine 304.

Figure 5:
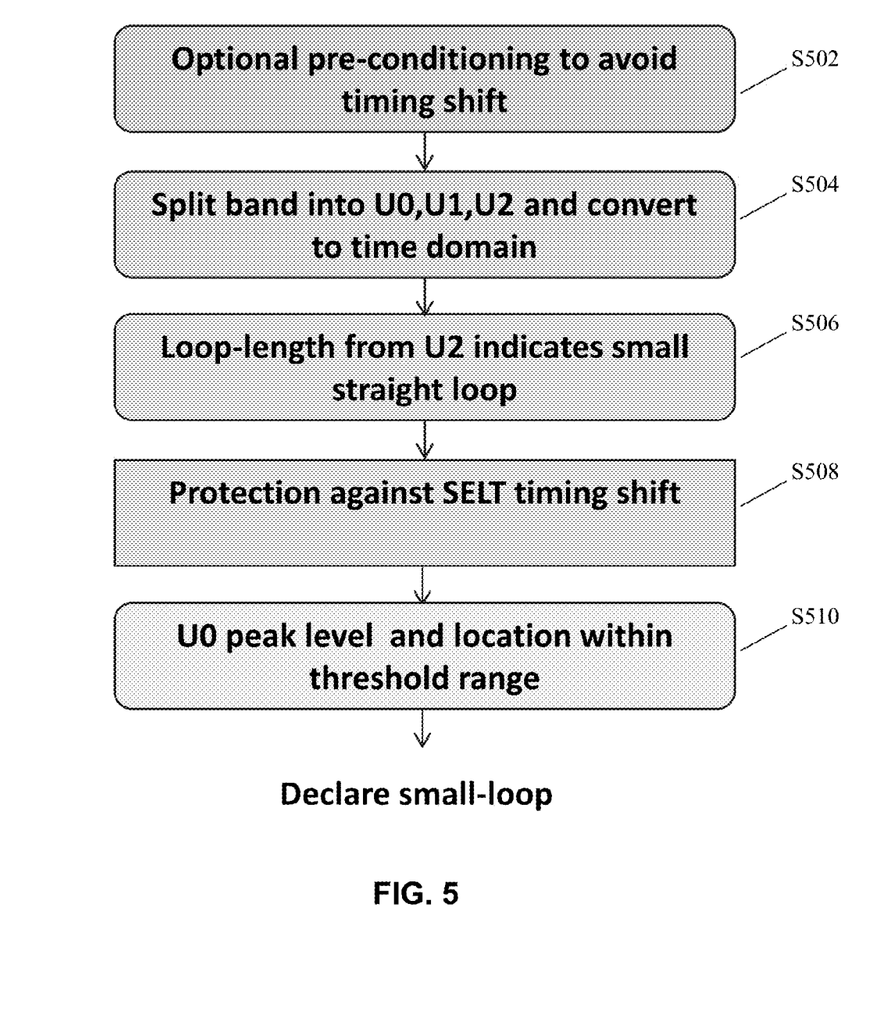
FIG. 5 is a flowchart illustrating an example methodology for detecting small-loop conditions (e.g. improper connection near CPE) according to embodiments of the invention.

An example methodology according to embodiments of detecting the small loop condition are shown in FIG. 5, and described below.

The rx/tx timing shift is the change in delay between when a SELT signal is transmitted and when it is received. This is preferably fixed at no delays. However, the present inventors recognize that after various analog and digital processing in the CPE, there can be a small change in delay between different captures. While this timing shift is small, it can still affect the accuracy of small loop detections or even prevent detection. The best approach is to make sure that this does not happen by design (e.g. fine grain control of rx/tx timing or some form of calibration). In absence of that, as shown in the example of FIG. 5, an optional pre-conditioning step S502 can be performed to avoid issues from the rx/tx timing shift.

In embodiments, S502 includes transmitting SELT signals from the CPE with no loop attached and identifying the main peak in the U2 data from the captured S11 data as described in more detail below in connection with step S506. The location of the main peak is noted as the position of zero length and then compensated for later as described below. This procedure may be required at every startup, or it may be included in step S508 described below.

Next in step S504, in the example embodiments described herein, SELT signals are transmitted from the CPE using the VDSL band such as that shown in FIG. 2, and so there is SELT S11 data captured for the three upstream bands U0, U1 and U2 by capture block 302. The full SELT capture data is split into the three bands for U0, U1 and U2 by splitter 402, and an IFFT is performed on each of these bands by IFFTs 404 to form time-domain signals for each of the three bands. The signatures for the short loop are detected by analysis engine 302 by independently analyzing each of the bands. In the examples described in more detail hereinbelow, only the bands U0 and U2 are used. However, the invention is not limited to this example.

In a next step S506, the U2 band time-domain signal is scanned by analysis engine 304 to check if there is a single legitimate peak (meets a threshold for a peak which is predetermined empirically), and this peak is within the small loop range (for example 60 ft. or less). If there are multiple peaks or there are peaks beyond the small loop range (for example 60 ft. or less), then it cannot be a small loop, and no further analysis is needed. The location of the legitimate peak is noted.

Figure 6:
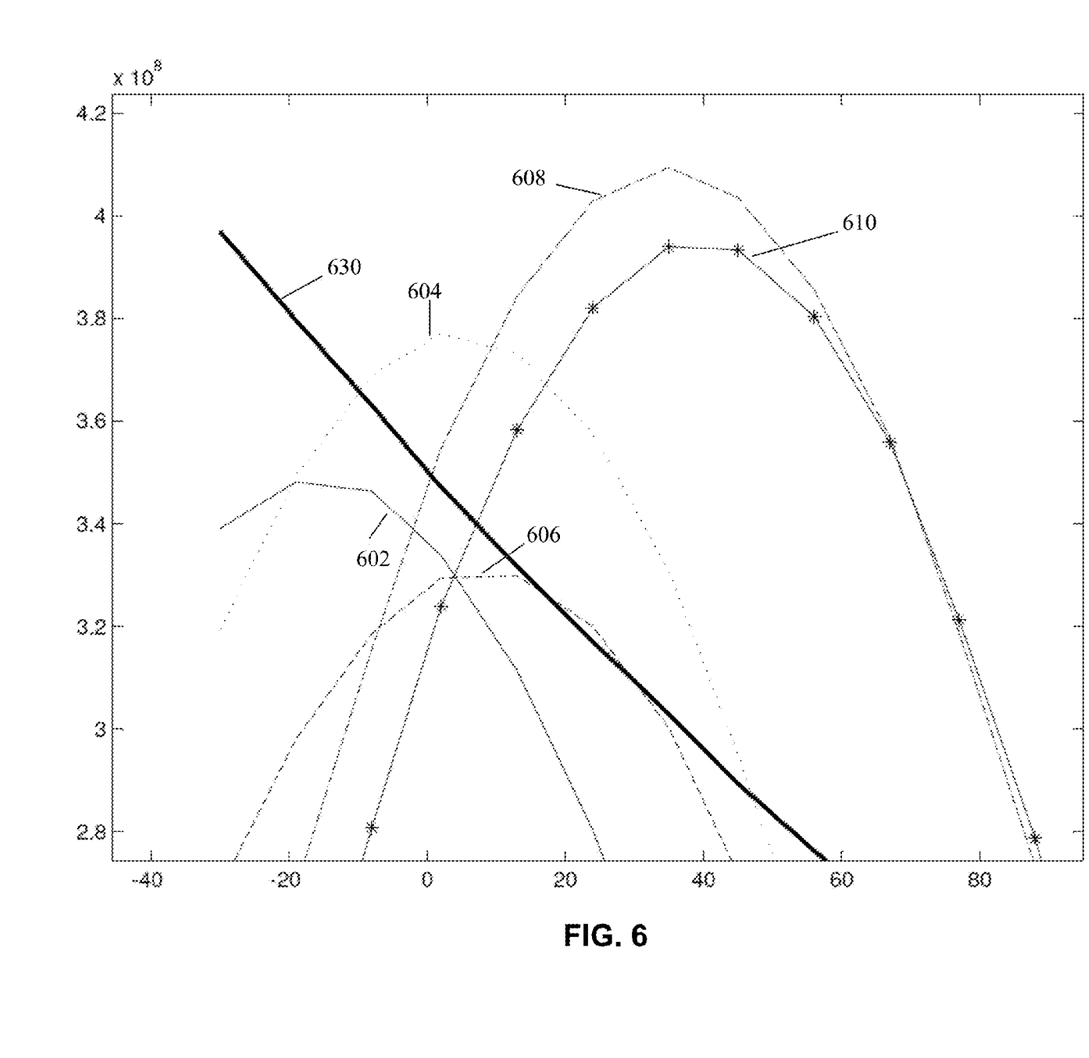
FIG. 6 is a diagram illustrating peaks in U2 band time domain signals associated with a line cut at various loop lengths that can be analyzed by embodiments of the invention.

FIG. 6 illustrates an example of how engine 302 can analyze U2 band peaks for a loop having a line cut at lengths of 6 ft. (i.e. plot 602), 18 ft. (i.e. plot 604), 30 ft. (i.e. plot 606), 42 ft. (i.e. plot 608) and 54 ft (i.e. plot 610). The line 630 is an example of the U2 peak threshold, which can be pre-determined empirically or from theoretical models. Accordingly, for example, because each of the U2 data plots shown in FIG. 6 has a peak at less than 60 ft. which exceeds the line 630, engine 302 will identify the peak as possibly indicating a small loop condition.

Figure 7:
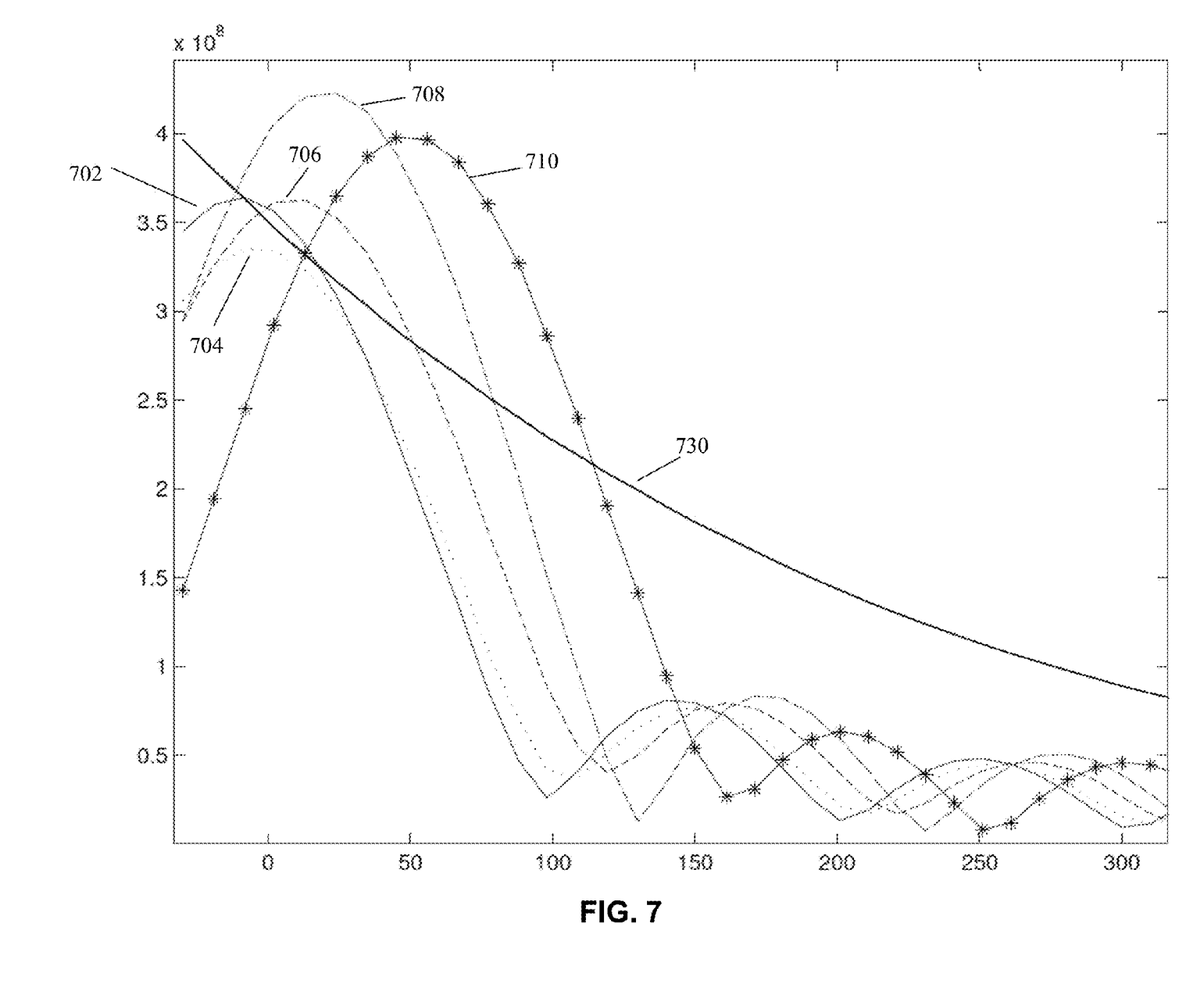
FIG. 7 is a diagram illustrating peaks in U2 band time domain signals associated with an improperly installed micro-filter at various loop lengths that can be analyzed by embodiments of the invention.

As another example, FIG. 7 illustrates the U2 band peaks for a micro filter wrongly placed at lengths of 6 ft. (i.e. plot 702), 18 ft. (i.e. plot 704), 30 ft. (i.e. plot 706), 42 ft. (i.e. plot 708) and 54 ft. (i.e. plot 710). Similar to FIG. 6, the line 730 going across is an example of the U2 peak threshold. Note that a wrongly placed microfilter will also be detected as an improper connection. Further similar to FIG. 6, because each of the U2 data plots shown in FIG. 7 has a peak at less than 60 ft. which exceeds the line 730, engine 302 will identify the peak as possibly indicating a small loop condition.

As set forth above, if step S506 does not identify any single legitimate peak at less than a predetermined length (e.g. 60 ft.), processing ends and no small loop condition is declared. Otherwise, as shown in FIG. 5, a next step S508 is to make sure there is protection against time shifts in SELT. This step is not required if the optional first step S502 is done, in which case processing proceeds to step S510.

In one example of step S508, the U2 time domain signal obtained in step S504 is searched again in a negative time direction from the identified peak from step S504. The presence of an additional negative time peak in U2 indicates a SELT timing shift, as well as a possible small loop condition. Examples of such negative peaks include those for plots 602 and 604 in FIG. 6.

A second scheme, as part of step S508, is to restart the CPE multiple times with the same loop under test, transmit SELT signals again and look for peaks in the time domain signal for the reflected U2 data. If the peak location changes then there is a likely timing shift. In that case the x-axis location associated with the peak location which occurs most often and is not in the negative axis is used in step S506.

Either way, processing proceeds to step S510 in which engine 304 analyzes the U0 time domain signal data to make sure that the U0 peak level at the small loop distances (as adjusted by the processing in step S502 or S508) is within a range of thresholds. In embodiments, these thresholds are chosen for a given modem empirically by measuring levels at different short distances, and choosing levels with some extra margin. Note that separate thresholds for both a maximum level and a minimum level can be used. In embodiments, only a single threshold is used.

For example, the signal level in the time domain U0 signal data is measured for all distances of small-loop between 0 ft and 70 ft, and the maximum and minimum U0 signal peak levels are determined. In embodiments, a margin of, for example, 10% is chosen (i.e. the minimum identified U0 signal level is reduced by 10% and the maximum U0 signal level is increased by 10%). These minimum and (in some embodiments) maximum U0 signal peak levels are then set as thresholds. If the signal peak level in a test falls within the threshold(s), the small loop condition is declared.

Figure 8:
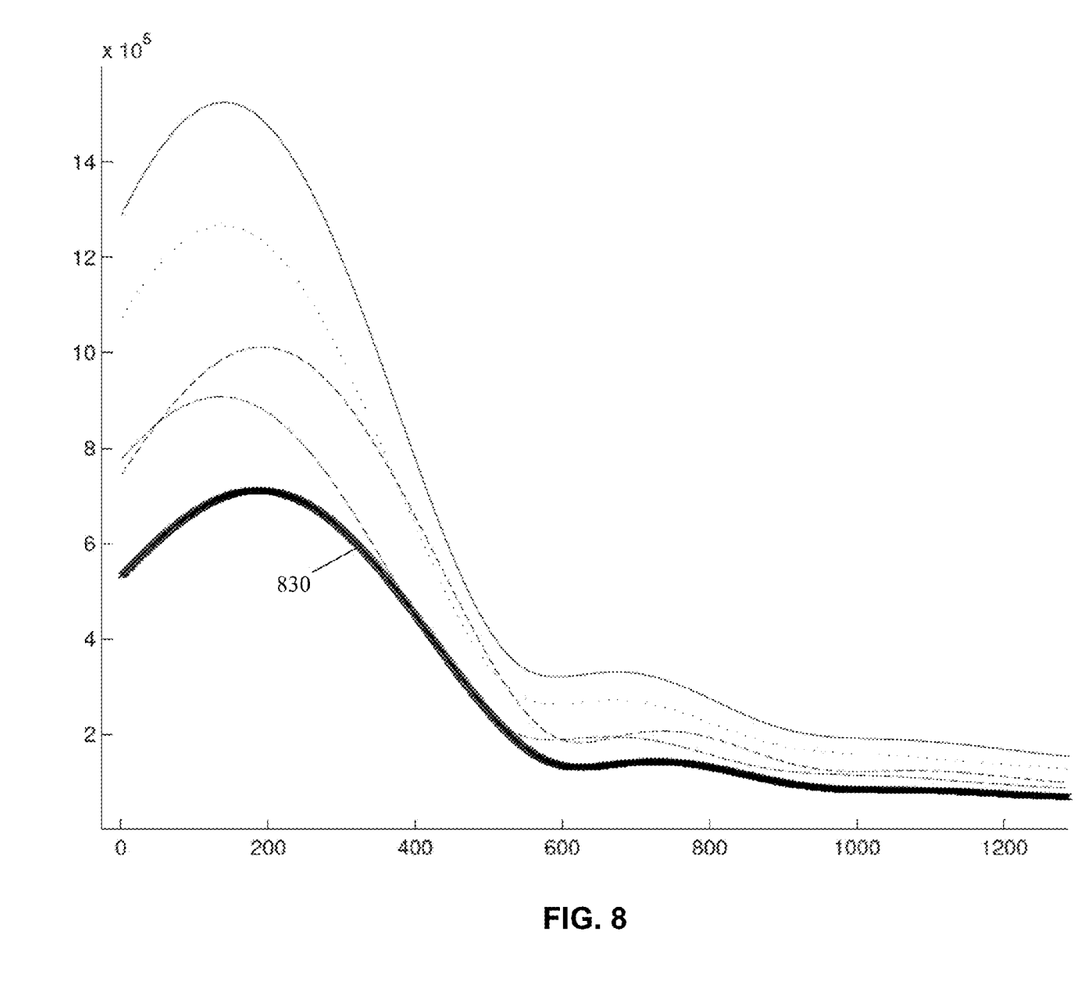
FIG. 8 is a diagram illustrating U0 band time domain signals associated with line cuts and micro-filters at various lengths that can be analyzed by embodiments of the invention.

FIG. 8 illustrates the U0 band peaks for line cuts and improperly placed micro-filter at various lengths, as well as an example threshold curve 830 that can be used in example implementations of the invention.

It should be noted that embodiments of the invention can be practiced together with the SELT functionalities described in co-pending application Ser. No. 14/341,538 the contents of which are incorporated herein in their entirety.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method for examining connections near a modem in a communications system, comprising:
   receiving test signal data from the line for two or more separate frequency bands;
   separately converting the test signal data to at least first and second different sets of time domain data corresponding to first and second ones of the separate frequency bands; and
   separately analyzing the first and second time domain data to identify an improper connection near the modem.

2. A method according to claim 1, wherein the test signal data comprises frequency domain S11 data.

3. A method according to claim 1, wherein analyzing includes determining a short loop condition in a line coupled to the modem.

4. A method according to claim 1, wherein analyzing includes identifying peaks in one or both of the first and second different sets of time domain data.

5. A method according to claim 4, wherein analyzing further includes comparing identified peaks to a threshold, and declaring identified peaks exceeding the threshold as legitimate peaks.

6. A method according to claim 4, wherein the first one of the separate frequency bands is higher in frequency than the second one of the separate frequency bands, and wherein the identified peaks in the first set of time domain data are used to determine a short loop condition in the line.

7. A method according to claim 6, wherein if the short loop condition is determined using the identified peaks in the first set of time domain data, the identified peaks in the second set of time domain data are used to declare a short loop condition.

8. A method according to claim 7, wherein the identified peaks are compared to one or both of a minimum threshold and a maximum threshold.

9. A method according to claim 8, further comprising adjusting levels of the identified peaks by a margin before performing the comparison.

10. A method according to claim 1, further comprising protecting against timing shift in the modem.

11. A method according to claim 10, wherein protecting is performed in a pre-conditioning step performed before receiving the test signal data.

12. A method according to claim 1, wherein the modem is a CPE modem and the first and second separate frequency bands are separate first and second upstream bands in a xDSL system frequency band plan.

13. A method according to claim 12, wherein the test signal data is associated with symbols constructed using tones in only the first and second upstream bands.

14. An apparatus for examining connections near a modem in a communications system, comprising:
   a capture block that receives test signal data from the line for two or more separate frequency bands;
   first and second IFFTs that respectively convert the test signal data to at least first and second different sets of time domain data corresponding to first and second ones of the separate frequency bands; and
   a TDR analysis engine that analyzes separately the first and second time domain data to identify an improper connection near the modem.

15. An apparatus according to claim 14, wherein the test signal data comprises frequency domain S11 data.

16. An apparatus according to claim 14, wherein the first one of the separate frequency bands is higher in frequency than the second one of the separate frequency bands, and wherein identified peaks in the first set of time domain data are used to determine a short loop condition in the line.

17. An apparatus according to claim 16, wherein if the short loop condition is determined using the identified peaks in the first set of time domain data, identified peaks in the second set of time domain data are used to declare a short loop condition.

18. An apparatus according to claim 17, wherein the identified peaks are compared to one or both of a minimum threshold and a maximum threshold.

19. An apparatus according to claim 14, wherein the modem is a CPE modem and the first and second separate frequency bands are separate first and second upstream bands in a xDSL system frequency band plan.

* * * * *